(12) United States Patent
Jones et al.

(10) Patent No.: US 11,162,611 B2
(45) Date of Patent: Nov. 2, 2021

(54) FAUCET HANDLE WITH DUAL VALVE STEM CAVITIES

(71) Applicant: Danco, Inc., Irving, TX (US)

(72) Inventors: Robert Jones, Rockwall, TX (US); Jon Manoj, Mesquite, TX (US)

(73) Assignee: Danco, Inc., Irving, TX (US)

( * ) Notice: Subject to any disclaimer, the term of this patent is extended or adjusted under 35 U.S.C. 154(b) by 69 days.

(21) Appl. No.: 16/690,747

(22) Filed: Nov. 21, 2019

(65) Prior Publication Data

US 2020/0173576 A1 Jun. 4, 2020

Related U.S. Application Data

(60) Provisional application No. 62/772,851, filed on Nov. 29, 2018.

(51) Int. Cl.
*F16K 31/60* (2006.01)

(52) U.S. Cl.
CPC .................... *F16K 31/60* (2013.01)

(58) Field of Classification Search
CPC ....... F16K 31/60; F16K 31/607; E03C 1/0412
See application file for complete search history.

(56) References Cited

U.S. PATENT DOCUMENTS

| | | | |
|---|---|---|---|
| 2,499,739 A * | 3/1950 | Forbes | F16K 31/60 74/546 |
| 2,887,899 A * | 5/1959 | Urbas | F16K 31/60 74/545 |
| 3,964,514 A | 6/1976 | Manoogian et al. | |
| 4,056,216 A * | 11/1977 | Kotuby | B05B 11/3023 222/385 |
| 4,747,428 A | 5/1988 | Crawford et al. | |
| 5,093,959 A | 3/1992 | McTargett et al. | |
| 5,664,603 A | 9/1997 | Knapp | |
| 6,438,771 B1 * | 8/2002 | Donath, Jr. | F16K 31/60 137/359 |
| D523,114 S | 6/2006 | Schaffeld et al. | |
| 7,540,300 B2 | 6/2009 | Thomas et al. | |
| 8,881,755 B2 | 11/2014 | Thomas et al. | |
| 9,062,796 B2 | 6/2015 | Horsman et al. | |
| 9,217,512 B2 * | 12/2015 | Huang | F16K 31/60 |
| 2013/0014344 A1 * | 1/2013 | Huang | F16K 31/605 16/110.1 |
| 2013/0036857 A1 * | 2/2013 | Huang | F16K 31/60 74/543 |

(Continued)

*Primary Examiner* — Reinaldo Sanchez-Medina
(74) *Attorney, Agent, or Firm* — Scheef & Stone, LLP; Robin L. Barnes

(57) ABSTRACT

A faucet handle comprising two valve stem cavities. A first valve stem cavity is different from second valve stem cavity in at least one characteristic of size, shape, or orientation to allow a single faucet handle to be used with different valve stems for different types of applications. A first valve stem cavity may be configured to receive a valve stem in a substantially vertical orientation as may be commonly used with a lavatory faucet application and a second valve stem cavity may be configured to receive a valve stem in an angled orientation as may be commonly used with a tub or shower faucet application. Any combination of differing characteristics may be used for the first and second valve cavities to accommodate different valve stem characteristics.

17 Claims, 5 Drawing Sheets

(56) References Cited

U.S. PATENT DOCUMENTS

2014/0021393 A1* 1/2014 Sanchez, Jr. ............ F16K 31/60
   251/292
2014/0060686 A1 3/2014 Kemp et al.
2015/0152975 A1 6/2015 Jonte

* cited by examiner

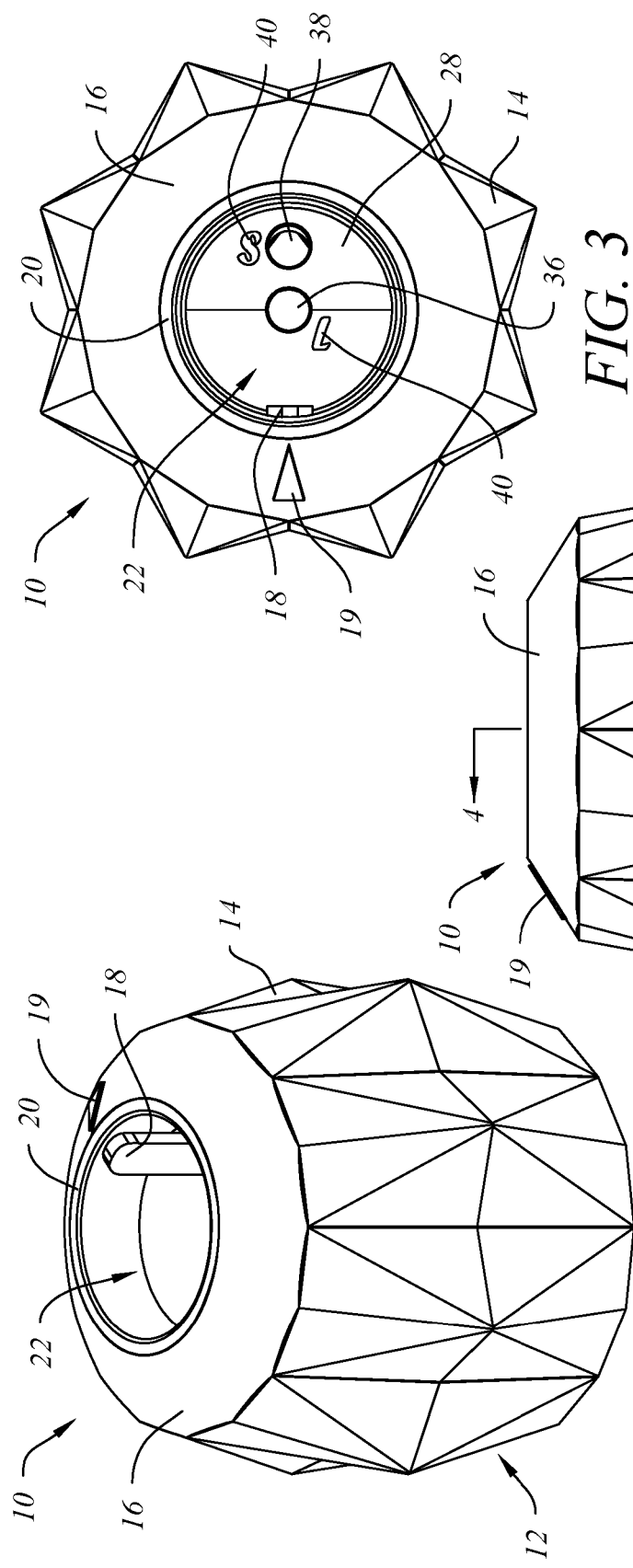

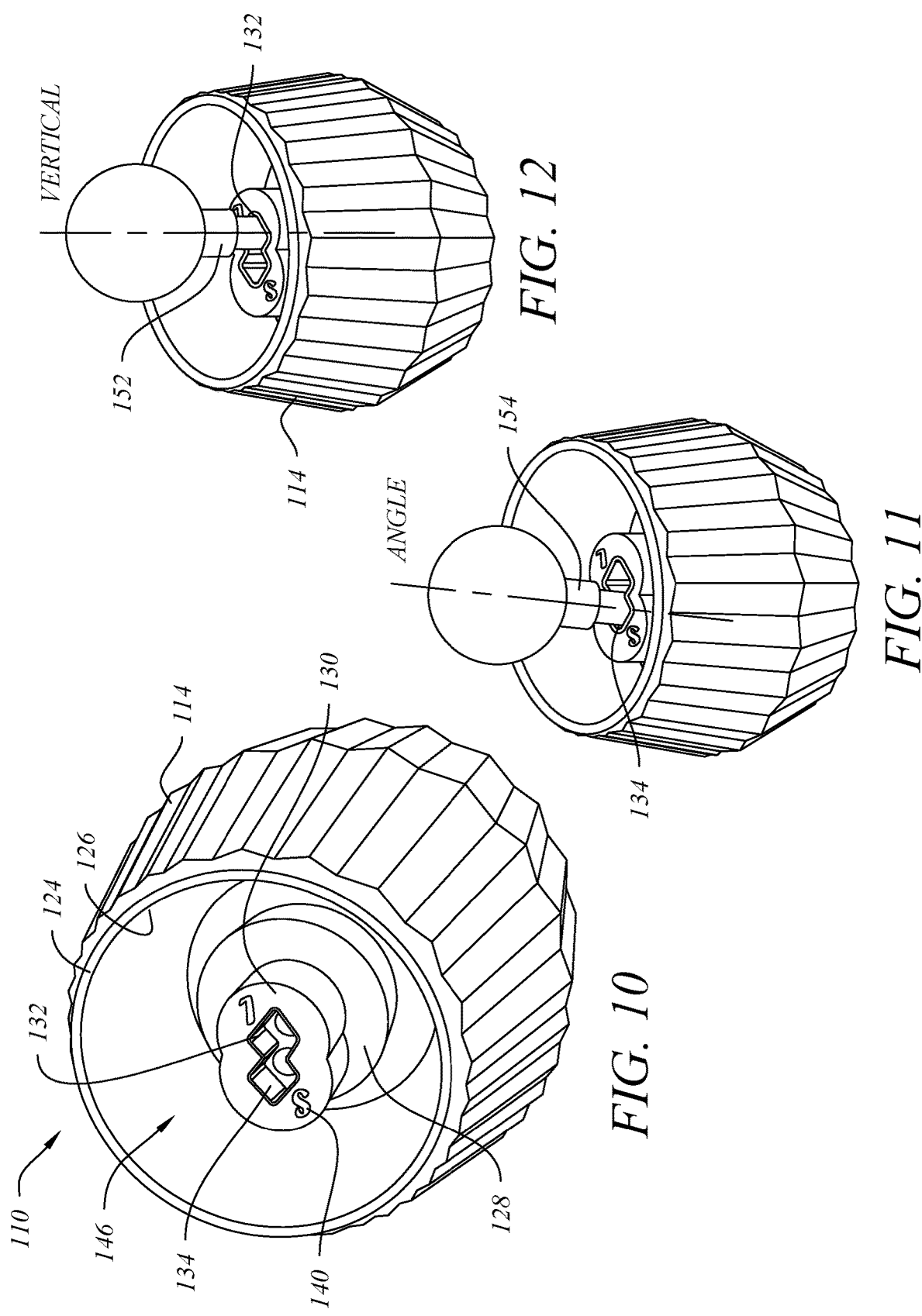

FAUCET HANDLE WITH DUAL VALVE STEM CAVITIES

CROSS REFERENCE TO RELATED APPLICATION

This application claims the benefit of U.S. Provisional Application Ser. No. 62/772,851 filed on Nov. 29, 2018.

BACKGROUND OF THE INVENTION

1. Field of the Invention

This invention relates to a handle for a lavatory or tub/shower faucet that is useable with two different valve stem configurations, allowing a single handle to work with either configuration.

2. Description of Related Art

Faucet handles typically include a single cavity into which a valve stem is inserted to control the flow of water through the faucet. Valve stems may have varying sizes, shapes, and orientations. For example, some valve stems are oriented for a straight, vertical insertion into the cavity on the handle, while others are oriented for an angled insertion into the handle. The vertical cavity handles are typically used for a sink or lavatory. The angled cavity handles are typically used for a tub or shower. If a handle needs to be replaced for mechanical or aesthetic reasons, the valve stem configuration would need to be matched with the stem cavity configuration on the replacement handle to allow the handle to fit the valve stem. The ornamental features of the handles for different stem configurations are frequently the same or similar, making it more difficult for the average person to select the correct handle on the first purchase, resulting in returned products and wasted time in replacing the handle. Additionally, it is more expensive to manufacture and stock two or more handles that appear the same or similar with the only difference being the stem cavity configuration. There is a need for a single handle that can be used with two or multiple different stem configurations.

SUMMARY OF THE INVENTION

Preferred embodiments provide a faucet handle that is usable with two different valve stem configurations. According to one preferred embodiment, a faucet handle comprises body having an outer surface, preferably a decorative outer surface, and an inner body comprising two valve stem cavities. Preferably, a first valve stem cavity is configured in size, shape, and orientation to receive a valve stem having a first configuration of size, shape, and orientation and a second valve stem cavity is configured in size, shape, and orientation to receive a valve stem having a second configuration of size, shape, and orientation different from the first valve stem.

According to another preferred embodiment, a first valve stem cavity is configured to receive a valve stem in a substantially vertical orientation and a second valve stem cavity is configured to receive a valve stem in an angled orientation. According to another preferred embodiment, the second valve stem cavity is angled at an angle of 4° to 12°, most preferably around 8°, relative to a longitudinal axis through the faucet handle. According to another preferred embodiment, each valve stem cavity is shaped and sized to mate with a valve stem having a shape and size, with the two cavities being different in at least one characteristic. According to another preferred embodiment a first or second valve stem cavity is substantially diamond shaped. According to another preferred embodiment, both valve stem cavities are substantially diamond shaped with a slight truncating overlap at an end of each cavity.

According to another preferred embodiment, an outer surface or outer sidewall comprises one or more protrusions. The protrusions may form a decorative design or shape, such as a faceted surface or two sloped surfaces that meet in a mid-section of the outer body. According to another preferred embodiment, an outer surface or outer sidewall comprises one or more design elements. The protrusions or design elements may be provided for aesthetic reasons and may also contribute to grip surface for moving the faucet handle to change the flow rate or temperature of water flow. Any style or shape may be used for outer surface. According to another preferred embodiment, a faucet handle comprises a cap configured to mate with an upper end of the outer surface of the faucet body. The cap is preferably removable to allow access to an upper interior portion of the body to allow a screw or other fastener to be inserted to connect the valve stem to the faucet handle body. The cap preferably coordinates in color, style, and material with the faucet handle outer surface.

Preferred embodiments of the faucet handle allow for ease of installation, particularly for homeowners and DIYers, with different valve stem configurations. These embodiments also allow for reduced manufacturing and stocking costs, since the same handle can be used in place of two separate prior art handles.

Preferred faucet handle embodiments of the invention are further described and explained in relation to the following drawings FIG. 1 is a perspective view of a faucet handle according to a preferred embodiment of the invention;

FIG. 2 is a front elevation of the faucet handle of FIG. 1;

FIG. 3 is a top plan view of the faucet handle of FIG. 1;

FIG. 10 is a perspective view of a faucet handle according to another preferred embodiment of the invention;

FIG. 11 is a perspective view of the faucet handle of FIG. 10 with a ball valve having an angled stem orientation inserted in a valve stem cavity;

FIG. 12 is a perspective view of the faucet handle of FIG. 10 with a ball valve having a vertical stem orientation inserted in a valve stem cavity.

DESCRIPTION OF THE PREFERRED EMBODIMENTS

Figure 6:
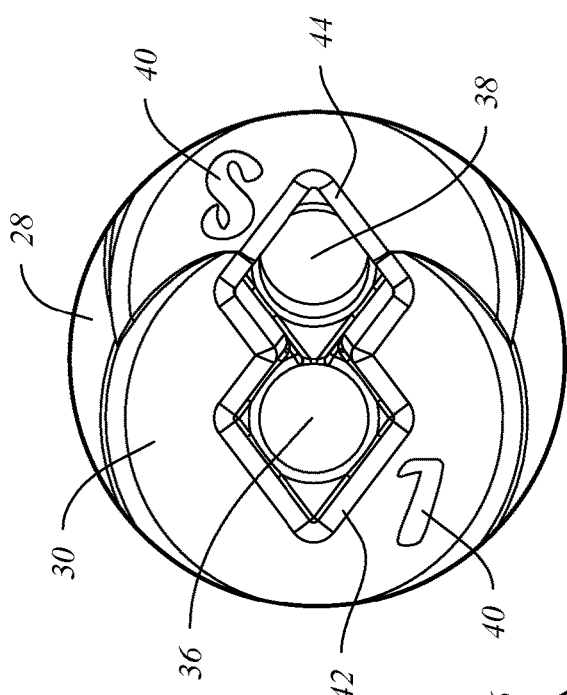
FIG. 6 is a detailed view of a portion of the faucet handle of FIG. 5.
Figure 9:
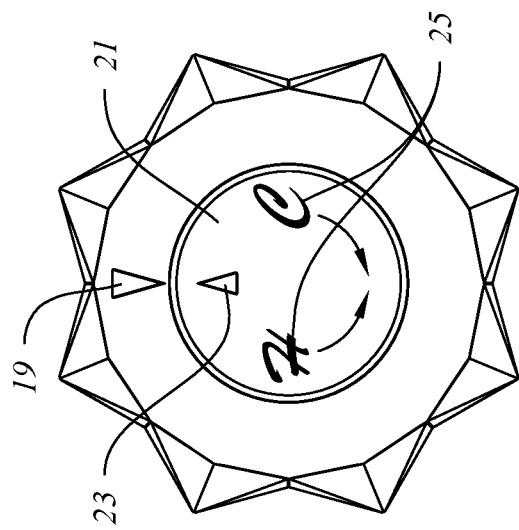
FIG. 9 is a perspective view of the faucet handle of FIG. 1 with a cap installed.
Figure 7:
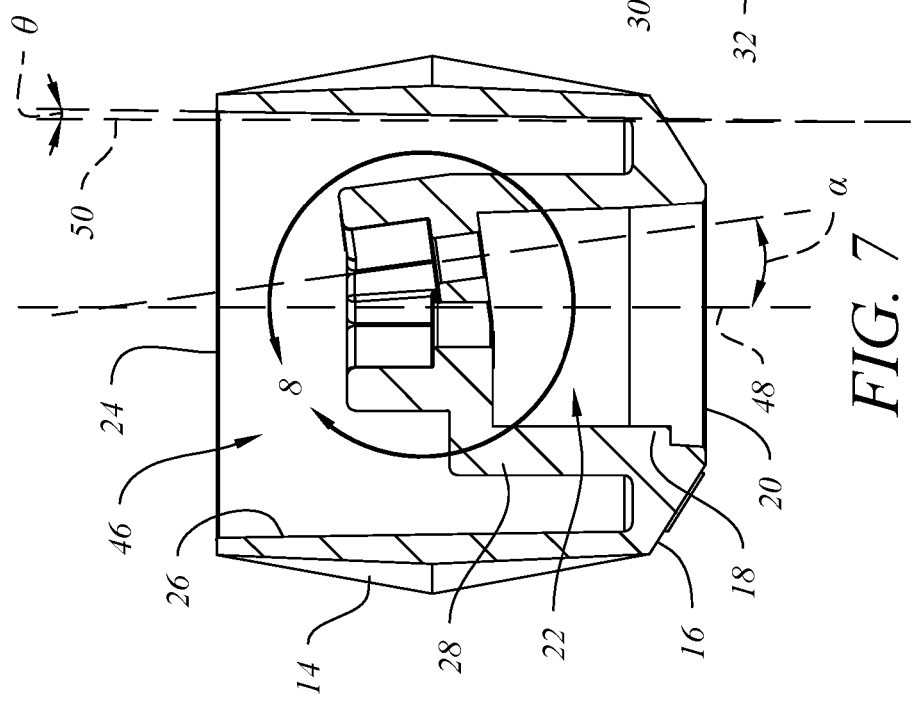
FIG. 7 is a cross sectional view of the faucet handle of FIG. 5.

One preferred embodiment of a faucet handle 10 is shown in FIGS. 1-9. Faucet handle 10 preferably comprises a body 12 and a cap 21. Faucet handle body 12 preferably comprises an outer sidewall 14, an upper or distal end 16, an inner sidewall 26, a lower or proximal edge 24, and an inner body comprising an upper portion 28 (or upper inner body) and a lower portion 30 (or lower inner body). Upper or distal end 16 is disposed further from the fixture (sink, tub, shower or faucet) when faucet handle 10 is installed and lower or proximal edge 24 is disposed nearer the fixture when installed. For ease of viewing, the orientation of faucet handle 10 shown in FIG. 7 is inverted compared to the orientation shown in FIG. 4. Upper end 16 is preferably substantially annular with a central aperture allowing access to upper cavity 22. An annular lip 20 is preferably disposed on an inner edge of upper end 16 and is configured to mate with a cap that rests on annular lip 20 when installation of faucet handle 10 to a valve stem is complete, as further described below. A cap 21 is preferably sized and shaped to mate with lip 20 and cover over the aperture formed by upper end 16 to hide upper cavity 22 from view once installation is complete, as shown in FIG. 9. One preferred shape for the cap is a disc shape. The cap preferably has a small groove or recess that allows it to be pried upward and removed from lip 20 if it later becomes necessary to replace or repair faucet handle 10. The cap may contain writing or graphics, such as a logo or indications of direction for accessing hot or cold water 25. Most preferably, outer sidewall 14, inner sidewall 26, upper body 28, lower body 30, and rib 18 are preferably unitarily formed from plastics or metal, but may also be separate components that are connectable together.

Outer sidewall 14 preferably comprises a decorative design or shape, such as a faceted surface (similar to that shown in FIGS. 1-2) or two sloped surfaces that meet in a mid-section of the outer body with less prominent facets or design features (similar to sidewall 114 shown in FIG. 12). A decorative surface may be provided on outer sidewall 14 for aesthetic reasons and/or to contribute to grip surface for moving faucet handle 10 to change the flow rate or temperature of water through the faucet. Any style or shape may be used for outer surface or sidewall 14. The cap preferably coordinates with the design, materials, and/or coloring of outer sidewall 14.

Inner sidewall 26 is preferably substantially cylindrical with a slight outward angle θ from a longitudinal axis 50 perpendicular or substantially perpendicular to a bottom edge 24 of sidewall 26 or outer sidewall 14. Angle θ is preferably between 0° to 4°, most preferably around 4°. Inner upper body 28 has an inner sidewall that preferably corresponds to the size of the aperture formed by upper end 16. Upper body 28 has a substantially cylindrical sidewall. A rib 18 extends longitudinally along an inner surface of the sidewall of upper body 28, protruding inwardly from the sidewall. Rib 18 is optional and may be used to align cap 21 on faucet handle. Cap 21 may optionally include a recess or groove configured to receive rib 18 or rib 18 may be used as a visual indicator for aligning cap 21 relative to alignment marking 23 and/or other indicators 25 on cap 21. Inner cavity 22 is disposed within the walls of upper body 28. Inner cavity 46 is disposed between the inner sidewall 26 and the outer surfaces of lower body 30 and upper body 28.

Lower body 30 extends from upper body 28 toward lower edge 24. Lower body 30 is preferably also substantially cylindrical and preferably with a smaller diameter than upper body 28. Disposed through lower body 30 are two valve stem cavities, 32 and 34. First valve stem cavity 32 is configured to receive a valve stem having a first orientation, shape, and size. Second valve stem cavity 34 is configured to receive a different valve stem having a second orientation, shape, and size, wherein the second orientation, shape, and/or size is different from the first orientation, shape, and/or size. In other words, first valve stem cavity 32 is different from second valve stem cavity 34 in at least one characteristic of size, shape, or orientation (e.g. vertical alignment vs. angled alignment or angled alignment at one angle vs. angled alignment at a different angle). In this way, faucet handle 10 is useable with two different valve stems. Most preferably, first valve stem cavity 32 is configured to receive a valve stem oriented in a substantially vertical direction (parallel to longitudinal axis 48) and second valve stem cavity 34 is configured to receive a valve stem oriented at an angle, with the cavities preferably otherwise being the same or substantially the same in shape and size. To receive a valve stem oriented at an angle, second valve stem cavity 34 is preferably disposed at an angle α relative to a longitudinal axis 48 that is substantially perpendicular to lower edge 24. Angle α is preferably between 4° to 12°, and most preferably around 8° as shown in FIG. 7. When a second valve stem cavity 34 has an angled orientation, lower body 30 preferably has a slight angle in a portion of the sidewall that forms the second valve stem cavity 34 to correspond to angle α.

Figure 8:
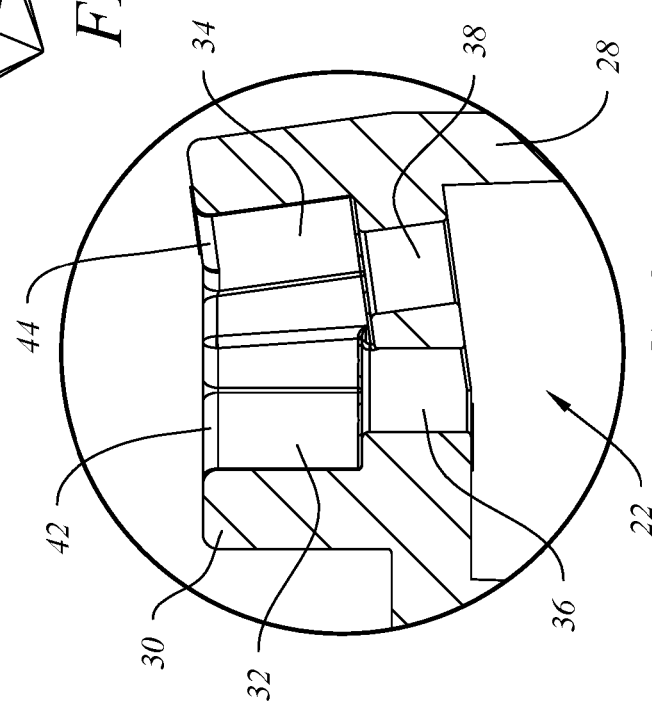
FIG. 8 is a detailed view of a portion of the faucet handle of FIG. 7.

As shown in the detail views of FIGS. 6 and 8, according to one preferred embodiment, first and second valve stem cavities 32 and 34 are each substantially diamond shaped with rounded upper edges 42 and 44, respectively. The rounded upper edges on interior ends of the diamond shaped cavities slightly overlap and are truncated as shown in FIG. 6. This particular shape is for insertion of similarly shaped valve stems. Valve stem cavities 32 and 34 may have other shapes and sizes as needed to accommodate other sizes and shapes of valve stems, as will be understood by those of ordinary skill in the art.

An upper end of lower body 30 is connected to, and preferably unitary with, a lower end of upper body 28. Disposed therein are a first fastener cavity 36 and a second fastener cavity 38. Most preferably, each fastener cavity 36, 38 is substantially cylindrical and preferably sized to receive a fastener, such as a screw, to connect faucet handle 10 to a valve stem (such as 152, 154 shown in FIGS. 11-12). The orientation of the first valve stem cavity 32 preferably is the same as the orientation of the first fastener cavity 36. Similarly, the orientation of the second valve stem cavity 34 preferably is the same as the orientation of the second fastener cavity 38, such that when second valve stem cavity 34 is angled, second fastener cavity 38 is preferably disposed at the same angle α as second valve stem cavity 34. First fastener cavity 36 is preferably centrally aligned with a central axis through first valve stem cavity 32, forming a first open channel through the inner body of faucet handle 10. Second fastener cavity 38 is preferably centrally aligned with a central axis through second valve stem cavity 34, forming a second open channel through the inner body of faucet handle 10. Each fastener cavity 36, 38 is preferably smaller in size than its corresponding valve stem cavity. When a valve stem is inserted into the appropriate valve stem cavity 32 or 34 from the proximal end of faucet handle 10 via cavity 46, a fastener or screw is inserted from the distal end via cavity 22 into the appropriate fastener cavity 36 or 38 and into the end of the valve stem (which is configured to receive such a fastener). Most preferably, the distal head end of the fastener or screw is wider than the diameter of the fastener cavity 36 or 38 to rest upon a bottom wall of upper body 28 when connected to the valve stem. This allows the faucet handle 10 to be removable, but still securely connected to the valve stem so that it cannot be inadvertently pulled off the valve stem during use.

According to another preferred embodiment, first fastener cavity 36 is different from second fastener cavity 38 in at least one characteristic of size, shape, or orientation (vertical alignment vs. angled alignment or angled alignment at one angle vs. angled alignment at a different angle) to allow for the use of different types of fasteners that may correspondingly engage with different valve stems insertable into valve stem cavities 32, 34. These indicators can be permanently molded, laser marked, ink stamped etc.

Figure 5:
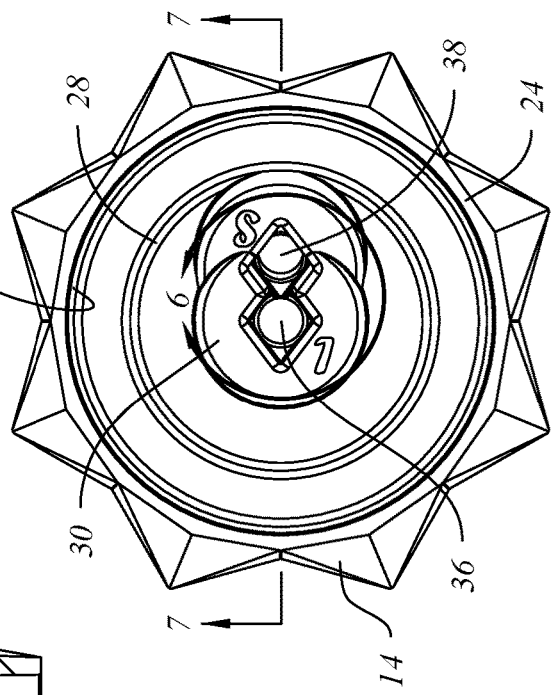
FIG. 5 is a bottom plan view of the faucet handle of FIG. 1.
Figure 4:
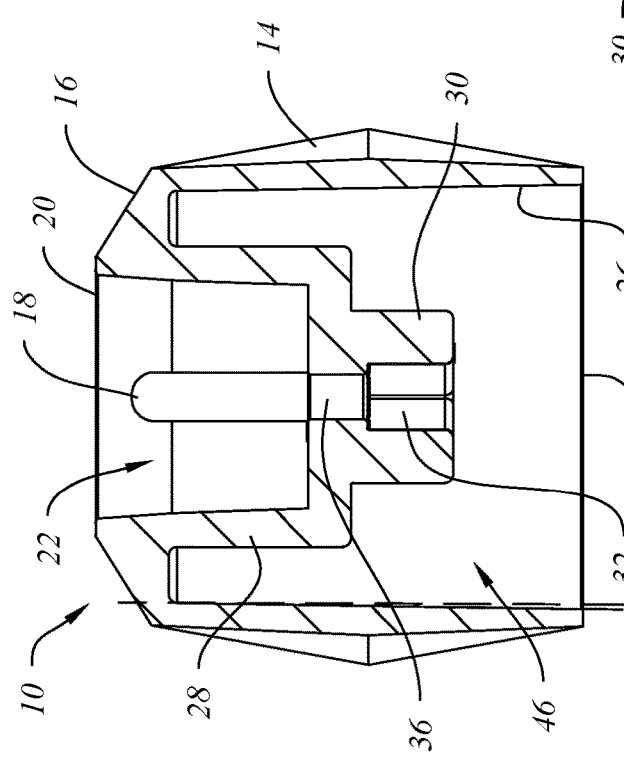
FIG. 4 is a front elevation cross-sectional view of the faucet handle of FIG. 2.

Most preferably, a surface near the openings to first and second valve stem cavities 32, 34 and/or first and second fastener cavities 36, 38 are marked with one or more indicators 40, as shown in FIGS. 3, 5, and 6. Indicators provide information to aid the user in inserting the valve stem for a particular application into the correct valve stem cavity 32 or 34. For example, a first indicator 40 may be the letter "L" (for lavatory), indicating that cavity 32 is for use with the type of vertical orientation valve stem that is typically used with a sink or lavatory application. A second indicator 40 may be the letter "S" (for shower), indicating that cavity 34 is for use with the type of angled orientation valve stem that is typically used with a shower or tub. Other indicators may also be used.

Faucet handle 10 is easily installed by homeowners or DIYers, allowing for easy new installations or replacement installations. For a new installation, the user places faucet handle 10 over the exposed valve stem, aligning the stem with either first valve stem cavity 32 or second valve stem cavity 34 depending on the size/shape/orientation of the valve stem. For example, the user would align the valve stem with cavity 32 for a typical lavatory installation and would align the valve stem with cavity 34 for a typical shower or tub installation. The faucet handle is pushed down over the valve stem to fully insert the stem into the cavity 32 or 34. Proximal edge 24 will preferably rest leaving a small gap to the fixture (sink or shower/tub wall) or to the faucet body or to an escutcheon disposed on the fixture, but may also sit flush or substantially flush with such fixture, escutcheon or faucet body. A fastener, such as a screw, is inserted through cavity 22 into the appropriate fastener cavity 36 or 38 to connect the faucet handle 10 to the valve stem. The cap is then placed over the aperture in upper end 16 to cover over cavity 22 and the fastener cavities 36, 38, providing a finished look to the faucet handle. For replacement, the old faucet handle is first removed, exposing the valve stem. The replacement installation then follows the same steps as with a new installation.

Figure 13:
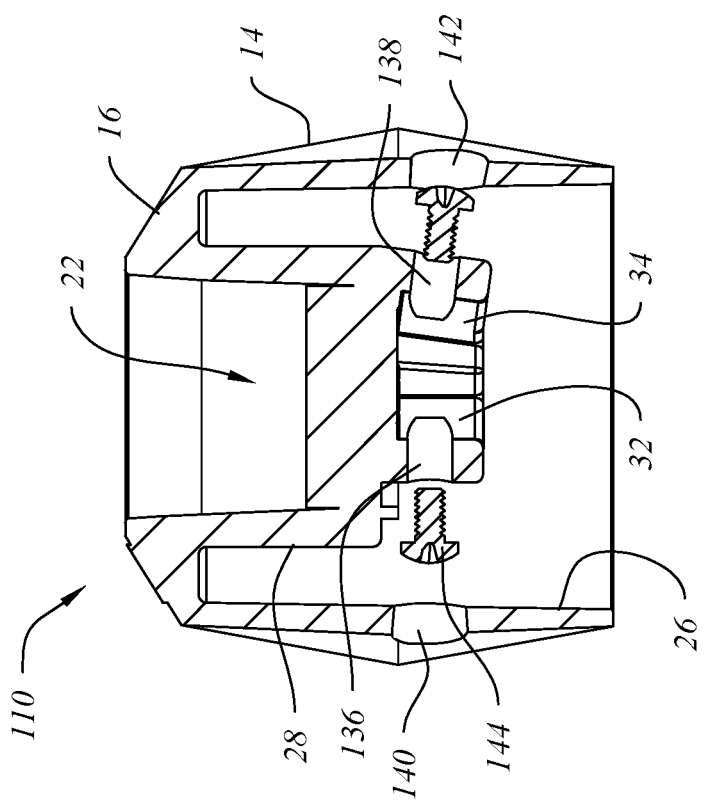
FIG. 13 is a cross-sectional view of a faucet handle according to another preferred embodiment of the invention.

According to another preferred embodiment as shown in FIG. 13, fastener cavities 136 and 138 may be disposed through a sidewall on the inner body of faucet handle 10 (such as through lower body 30) to engage the valve stem from the side (through cavity 46), rather than through upper body 28/cavity 22 as previously described. In this alternate embodiment, corresponding access apertures 140, 142 through inner sidewall 26 (and optionally through outer sidewall 14) are provided to allow insertion of the fastener (such as a screw 144) to engage the valve stem to connect faucet handle 10 to the valve stem. Most preferably, such access apertures 140, 142 are located through inner sidewall 26 only, with outer sidewall 14 being a separate, removable component that can be slipped over inner sidewall 26 after the fasteners are inserted and connected. In such an embodiment, an interior surface of outer sidewall 14 may be formed from non-slip or slip-resistant materials to provide a frictional grip on an outer surface of inner sidewall 26 to prevent outer sidewall 14 from inadvertently being removed during use. In addition thereto, or as another alternative, a small aperture may be disposed through separate outer sidewall 14 to allow a set screw to be inserted to engage with inner sidewall 26 to prevent inadvertent removal of outer sidewall 14 during use. The small aperture for a set screw would be less noticeable than when the access apertures for the fasteners are disposed through both the outer and inner sidewalls 14, 26. In this embodiment, a separate cap to cover over cavity 22 may not be needed, as outer sidewall 14 may be a full decorative outer body including a sidewall and an integrated upper end/cap to completely cover over all of the inner portions of the faucet handle 10.

According to another preferred embodiment, faucet handle 10 further comprises a cap alignment mark 19 disposed on upper end 16. Cap 21 also preferably comprises a corresponding alignment mark 23 on its upper surface to aid a user in installing cap 21 onto faucet handle 10 by aligning mark 23 with mark 19. Cap 21 also preferably comprises additional markings 25 to show direction of movement for faucet handle 10 for hot and cold water. Alignment mark 19 is optional and may be used with rib 18 or in place of rib 18.

Referring to FIGS. 10-12, another preferred embodiment of a faucet handle 110 is shown. Faucet 110 is substantially similar to faucet handle 10 and any feature described with faucet handle 10 may also be used with faucet handle 110. Faucet handle 110 preferably comprises an outer sidewall 114, an inner sidewall 126, a lower or proximal edge 124, and an inner body comprising an upper portion or upper inner body 128 and a lower portion or lower inner body 130. For ease of viewing, the orientation of faucet handle 110 shown in FIGS. 10-12 is in an inverted position, similar to that shown in FIG. 7.

Outer sidewall 114 preferably comprises a decorative shape, such as two sloped surfaces that meet in a mid-section of the outer sidewall. Outer sidewall 114 has less prominent facets or design features compared to outer sidewall 14. A decorative surface may be provided on outer sidewall 114 for aesthetic reasons and/or to contribute to grip surface for moving faucet handle 110 to change the flow rate or temperature of water. Any style or shape may be used for outer surface 114. Inner sidewall 126 is preferably substantially cylindrical with a slight outward angle, like angle $\theta$ on inner sidewall 26. Upper body 128 has a substantially cylindrical sidewall. Inner cavity 146 is disposed between the inner sidewall 126 and the outer surfaces of lower body 130 and upper body 128. Lower body 130 extends from upper body 128 toward lower edge 124. Disposed through lower body 130 are two valve stem cavities, 132 and 134. First valve stem cavity 132 is configured to receive a valve stem having a first orientation, shape, and size. Second valve stem cavity 134 is configured to receive a different valve stem having a second orientation, shape, and size, wherein the second orientation, shape, and/or size is different from the first orientation, shape, and/or size. In other words, first valve stem cavity 132 is different from second valve stem cavity 134 in at least one characteristic of size, shape, or orientation (vertical alignment (preferably substantially perpendicular to a horizontal plane across lower edge 124) vs. angled alignment (such as at an angle $\alpha$, for example) or angled alignment at one angle vs. angled alignment at a different angle). In this way, faucet handle 110 is useable with two different valve stems.

Most preferably, first valve stem cavity 132 is configured to receive a valve stem 152 oriented in a substantially vertical direction (as shown in FIG. 12) and second valve stem cavity 134 is configured to receive a valve stem 154 oriented at an angle (as shown in FIG. 11), with the cavities preferably otherwise being the substantially the same in shape and size. To receive a valve stem oriented at an angle, second valve stem cavity 134 is preferably disposed at an angle α like cavity 34. In this preferred embodiment, first and second valve stem cavities 132 and 134 are each substantially diamond shaped with interior ends of the diamonds slightly overlapping and truncated, similar to that shown FIG. 6. This particular shape is for insertion of similarly shaped valve stems. Valve stem cavities 132 and 134 may have other shapes and sizes as needed to accommodate other sizes and shapes of valve stems, as will be understood by those of ordinary skill in the art. Faucet handle 110 also has first and second fastener cavities as previously described with respect to faucet handle 10. Most preferably, a surface near the openings to first and second valve stem cavities 132, 134 and/or the corresponding first and second fastener cavities are marked with one or more indicators 140. Indicators 140 provide information to aid the user in inserting the valve stem for a particular application into the correct valve stem cavity 132 or 134, as previously described for indicators 40.

Any component, feature, or step of a preferred embodiment herein may be used with any other components, features, or steps of other embodiments or alternatives even if not specifically described with respect to that embodiment or alternative. Any dimension described herein within preferred ranges may be used in any subset of such range, even if the specific subset of the range is not specifically described herein, and including subset ranges than overlap the end values of more preferred ranges. Those of ordinary skill in the art will also appreciate upon reading this specification and the description of preferred embodiments herein that modifications and alterations to faucet handles may be made within the scope of the invention and it is intended that the scope of the invention disclosed herein be limited only by the broadest interpretation of the appended claims to which the inventors are legally entitled.

What is claimed is:

1. A faucet handle comprising:
   a first valve stem cavity having a first shape, a first size, and a first orientation; and
   a second valve stem cavity having a second shape, a second size, and a second orientation;
   wherein the first orientation of the first valve stem cavity is different from the second orientation of the second valve stem cavity; and
   wherein the first orientation is substantially parallel to a longitudinal axis through the faucet handle and the second orientation is disposed at an angle between 4° to 12° relative to the longitudinal axis.

2. The faucet handle according to claim 1 further comprising:
   a first fastener cavity having a third shape, a third size, and a third orientation; and
   a second fastener cavity having a fourth shape, a fourth size, and a second orientation;
   wherein (1) the third shape is different from the fourth shape; and/or (2) the third size is different from the fourth size; and/or (3) the third orientation is different from the fourth orientation.

3. The faucet handle according to claim 2 wherein the first orientation of the first valve stem cavity is the same as the third orientation of the first fastener cavity and the second orientation of the second valve stem cavity is the same as the fourth orientation of the second fastener cavity.

4. The faucet handle of claim 1 further comprising a first fastener cavity aligned with the first valve stem cavity and configured to receive a first fastener to engage with a valve stem inserted through the first valve stem cavity; and
   a second fastener cavity aligned with the second valve stem cavity and configured to receive a second fastener to engage with a valve stem inserted through the second valve stem cavity.

5. The faucet handle according to claim 1 wherein (1) the first shape is different from the second shape; and/or (2) the first size is different from the second size.

6. A faucet handle comprising:
   a first valve stem cavity having a first shape, a first size, and a first orientation; and
   a second valve stem cavity having a second shape, a second size, and a second orientation;
   an inner body;
   a first fastener cavity;
   as second fastener cavity;
   one or more indicators disposed on a surface of the inner body near the first fastener cavity, the second fastener cavity, the first valve stem cavity, the second valve stem cavity or a combination thereof to indicate which of the first or second valve stem cavities should be used for a particular application;
   wherein (1) the first shape is different from the second shape; and/or (2) the first size is different from the second size; and/or (3) the first orientation is different from the second orientation; and
   wherein the first and second valve stem cavities and first and second fastener cavities are disposed in the inner body.

7. The faucet handle according to claim 6 wherein the first fastener cavity is aligned with the first valve stem cavity and the second fastener cavity is aligned with the second valve stem cavity.

8. The faucet handle according to claim 6 further comprising a decorative outer sidewall.

9. The faucet handle according to claim 8 further comprising an annular upper end disposed inwardly of the decorative outer sidewall and forming an aperture through which the first and second fastener cavities are accessible; and
   a removable cap configured to cover the aperture.

10. The faucet handle according to claim 8 wherein the decorative outer sidewall and inner body are integrally formed.

11. The faucet handle according to claim 6 further comprising an inner sidewall surrounding the inner body; and
    a removable decorative outer body surrounding the inner sidewall.

12. The faucet handle according to claim 11 wherein the inner sidewall and inner body are integrally formed.

13. The faucet handle according to claim 11 wherein the first fastener cavity is configured to receive a first fastener to engage with a valve stem inserted through the first valve stem cavity and the first fastener cavity is not aligned with the first valve stem cavity.

14. The faucet handle according to claim 13 wherein the second fastener cavity is configured to receive a second fastener to engage with a valve stem inserted through the second valve stem cavity and the second fastener cavity is not aligned with the second valve stem cavity.

15. A faucet handle comprising:
    a first valve stem cavity having a first shape, a first size, and a first orientation;

a second valve stem cavity has a second shape, a second size, and a second orientation;
an inner body;
a first fastener cavity and a second fastener cavity;
a sidewall surrounding the inner body, the sidewall disposed at an angle between 0° to 4° relative to a longitudinal axis through the faucet handle;
wherein (1) the first shape is different from the second shape; and/or (2) the first size is different from the second size; and/or (3) the first orientation is different from the second orientation; and
wherein the first and second valve stem cavities and first and second fastener cavities are disposed in the inner body.

16. The faucet handle according to claim 15 wherein the first orientation is substantially parallel to the longitudinal axis and the second orientation is disposed at an angle between 4° to 12° relative to the longitudinal axis.

17. The faucet handle according to claim 15 wherein the sidewall comprises an outer surface having one or more protrusions.

\* \* \* \* \*